United States Patent
Nishikawa (12)

(10) Patent No.: US 6,370,194 B2
(45) Date of Patent: Apr. 9, 2002

(54) MOTION VECTOR ESTIMATION CIRCUIT AND METHOD

(75) Inventor: Tsuyoshi Nishikawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/238,122

(22) Filed: Jan. 27, 1999

(30) Foreign Application Priority Data

Jan. 30, 1998 (JP) ............................................ 10-019987

(51) Int. Cl.⁷ .............................. H04N 7/12; H04N 7/30
(52) U.S. Cl. .................................. 375/240.16; 348/699
(58) Field of Search ................................ 348/699, 700, 348/402.1, 407.1, 413.1, 416.1; 375/240, 240.12, 240.13, 240.14, 240.15, 240.16, 240.24; H04N 7/12, 7/36

(56) References Cited

U.S. PATENT DOCUMENTS

| | | | | |
|---|---|---|---|---|
| 5,696,836 A | * | 12/1997 | Yoshino et al. | 348/699 |
| 5,719,642 A | * | 2/1998 | Lee | 348/699 |
| 5,790,206 A | * | 8/1998 | Ju | 375/240.14 |
| 5,838,827 A | * | 11/1998 | Kobayashi et al. | 375/240.16 |
| 5,859,673 A | * | 1/1999 | Kobayashi et al. | 348/699 |
| 5,870,500 A | * | 2/1999 | Daoudi et al. | 382/236 |
| 5,973,742 A | * | 10/1999 | Gardyne et al. | 375/240.15 |
| 6,016,163 A | * | 1/2000 | Rodriguez et al. | 375/240.24 |
| 6,061,397 A | * | 5/2000 | Ogura | 375/240.16 |

OTHER PUBLICATIONS

Kun–Min Yang et al.; "A family of VLSI Designs for the Motion Compensation Block–Matching Algorithm", IEEE Transactions on Circuits and systems, vol. 36, No. 10, Oct., 1989.

Viet L. Do, et al.; "A Low–Power VLSI Architecture for Full–Search Block–Matching Motion Estimation;" IEEE Transactions on Circuits and Systems for Video Technology; vol. 8; No. 4; Aug., 1998.

* cited by examiner

Primary Examiner—Nhon Diep
(74) Attorney, Agent, or Firm—Hogan & Hartson, L.L.P.

(57) ABSTRACT

A motion vector estimation circuit includes an assigning element having a grouping part for dividing candidates in a search range into a plurality of groups, and a part for determining the order for accumulation being carried out preferentially from a group having a high possibility of including a true motion vector; an accumulating element for parallel inputting original image data and reference image data to accumulate an absolute value of a difference between both data according to the order determined by the assigning element; a circuit for comparing the output of the accumulating element with minimum-value information for management; a stopping element having a separate stop circuit for stopping operations of each of the accumulating circuits after detecting the minimum-value information; and a control element for controlling the accumulating element and the stopping element.

12 Claims, 9 Drawing Sheets

44: MOTION VECTOR OF A (ONE POINT)
46: MOTION VECTOR PREPARED BY INTERMEDIATE VALUES OF x,y COMPONENTS OF MOTION VECTORS OF A,B,C (TWO POINTS)
45: MOTION VECTOR OF C (ONE POINT)
44: MOTION VECTOR OF B (ONE POINT)

47: MOTION VECTOR CANDIDATE GROUP REVIEWING ORDER

MOTION VECTOR ESTIMATION CIRCUIT AND METHOD

BACKGROUND OF THE INVENTION

The present invention generally relates to a motion vector estimation circuit for estimating a motion vector for a macro block, which is a predetermined range in a frame or field of a moving picture. More specifically, the invention relates to a motion vector estimation circuit for accumulating the differences between the signal strength of the pixels of original and reference images corresponding to a motion vector candidate for the macro block, to select a motion vector candidate having a minimum accumulation result as a motion vector.

In a typical moving picture information processing, a motion vector is estimated by operating a value for a pixel in a macro block using the following technique. That is, for a certain motion vector candidate, the signal strength of a pixel in a macro block on an original image is compared with the signal strength of each of the pixels on a reference image which has a region corresponding to the macro block and which is obtained by the translating of the original image by a distance corresponding to a motion vector, to accumulate a value indicative of the difference between the signal strength for all of the pixels in the macro block. This operation is carried out for all of motion vector candidates, and the accumulated result obtained for each of the motion vector candidates is sequentially compared to estimate a candidate having a minimum accumulation result as a motion vector. In the above described technique, the term "reference image" means an image of a predetermined region corresponding to a macro block obtained by the translating of a macro block, which is a predetermined range in a frame or field of an original image, by a distance corresponding to a motion vector.

A motion vector estimation circuit for such a typical motion vector estimation is designed to carry out an accumulation processing at a high speed using a small amount of data by arranging a plurality of accumulator circuits in parallel and assigning the operation for a motion vector candidate to each of the accumulation circuits to output accumulation result data as a pipeline. In such a motion vector estimation circuit, each of the accumulation circuits is designed to carry out the operation of the signal-strength difference on the basis of the difference between the luminance value of a pixel forming a macro block of an original image and the luminance value of the corresponding pixel of a reference image. Specifically, each of the accumulator circuits carries out the operation for obtaining an absolute-value of the difference between luminance values of pixels of original and reference images, namely, |Luminance Value of Pixel of Original image—Luminance Value of Pixel of Reference Image|.

Specifically, when the motion vector estimation is carried out by the above described pipeline architecture system, the accumulation for regions corresponding to the respective motion vectors is carried out, and the same estimation is carried out for all of predetermined motion vector candidates to select and adopt a motion vector candidate, which has a minimum (or maximum) estimated value, from the motion vector candidates as a motion vector for the macro block. If the number of motion vector candidates, which can be estimated at a time, is defined as a parallel number, the motion vector estimation is completed by repeating the accumulation times obtained by dividing the number of all of the motion vector candidates by the parallel number. Therefore, when the processing is carried out by a parallel number m, each m candidates are selected from the motion vector candidates, and this processing is repeated until all of the candidates are selected. For example, if the total number of the motion vector candidates is 1024 and if the number of columns thereof is 16, 64 accumulation operations are repeated to complete the motion vector estimation.

Therefore, the motion vector estimation is not completed unless the second through number n estimations are sequentially repeated after the first estimation of the accumulated value for the motion vector candidates 1 through m is carried out. Such a motion vector estimation circuit must always carry out the accumulation operations by a fixed number of cycles regardless of the quality of an input original image, so that there are problems in that the number of cycles unnecessary for estimating motion vectors is used, and electric power consumption necessary for driving a circuit for estimating motion vectors is increased. In order to solve such problems, the inventors of the present invention have already proposed a motion vector estimation system for stopping unnecessary accumulation operation in Japanese Patent Application No. 8-341928 (1996).

This conventional motion vector estimation system comprises the construction shown in FIG. 15, which is provided in a motion vector estimation system for selecting a motion vector candidate of a specific region in a macro block, which is an image of a predetermined range in a frame or field of an original image, to calculate the difference between the signal strength of pixels corresponding to the motion vector candidates of original and reference images, to accumulate the signal strength difference calculated for the pixels in the macro block to derive the accumulation results, to select a motion vector candidate having a local maximum or local minimum accumulation result, as a motion vector, from the motion vector candidates in the specific region in the macro block.

That is, in FIG. 15, the motion vector estimation system comprises: accumulating means 1 comprising a plurality of differential absolute-value accumulating circuits 2a, 2b through 2n, which are connected as a pipeline for parallel inputting original image data D1 and reference image data D2 for motion vector candidates to carry out the accumulation of a plurality of motion vectors in parallel; accumulation stopping means 10 having a separate stop circuit 11 for stopping the accumulation operation of the accumulating means 1 for each of the accumulating circuits 2a, 2b through 2n; and control means 5 for controlling the supply of the original image data D1 and the reference image data D2 for the motion vector candidates to the accumulating circuits 2a, 2b through 2n of the accumulating means 1 and for outputting a separate stop signal S3 for stopping the separate accumulation to the separate stop circuit 11 to control the stopping of the accumulation operation of the corresponding accumulating circuit 2a, 2b or 2n.

Each of the accumulation results of the differential absolute-value accumulating circuits 2a, 2b through 2n forming the accumulating means 1 is outputted to a minimum-value information management circuit 4 as an accumulation signal S1. The minimum-value management circuit 4 compares the accumulation signal S1 with the minimum value of the differential absolute-values which have been inputted, and outputs a comparison result signal S2 to the control means 5. The control means 5 outputs a stop signal S3 to the accumulation stopping means 10 for controlling the stopping of the accumulation of each of the differential absolute-value accumulating circuits 2a through 2n forming the accumulating means 1 on the basis of the comparison result signal S2 supplied from the minimum-value information management circuit 4.

However, the conventional motion vector estimation system shown in FIG. 15 is not good from the point of view of the improvement efficiency. Because if the improvement efficiency is under the influence of the quality of the input moving picture to cause the reviewing order of a motion vector candidate, which is finally to be a motion vector, to be a later order in the whole motion vector candidates, the accumulation operation for that motion vector candidate is not carried out unless the accumulation operation for almost all of motion vector candidates at the substantially front of the reviewing order is carried out. For example, in a case where motion vector candidates are thus reviewed in fixed order, when the motion vectors on the screen are turned rearward as a whole, there are some possibilities of decreasing the motion vector finding efficiency for all of macro blocks.

If a motion vector candidate to be a final motion vector can be found at an initial stage of the estimation operation when a motion vector is estimated by the accumulation using the above described motion vector estimation system, the actual operation time for accumulation can be shorten to considerably increase the motion vector estimating efficiency and to reduce electric power consumption of each of arithmetic circuits for accumulating each of motion vector candidates in the estimation system.

SUMMARY OF THE INVENTION

It is therefore an object of the present invention to eliminate the aforementioned problems and to provide a motion vector estimation circuit which can improve operation time, i.e., operation efficiency, for motion vector estimation and which can reduce electric power consumption during retrieval operation.

In order to accomplish the aforementioned and other objects, according to one aspect of the present invention, there is provided a motion vector estimation circuit for setting, as motion vector candidates, vectors in an appropriate range for a macro block, which is an image of a predetermined range in a frame or field in a moving picture, to calculate a difference between signal strength for images corresponding to motion vector candidates of original and reference images, to accumulate the calculated difference between the signal strength for images in the macro block to derive accumulation results to select, as a motion vector, a motion vector candidate having a local maximum or local minimum accumulation result from the set motion vector candidates, the motion vector estimation circuit comprising: grouping means for dividing motion vector candidates in a search range, which is set for the motion vector candidates, into a plurality of motion vector candidate groups; priority order determining means for predicting an order from a motion vector candidate group, which has a high possibility of including a true motion vector, to a motion vector candidate group, which has a low possibility of including the true motion vector, to determine priority orders for accumulation to estimate motion vectors for each of motion vector candidate groups in accordance with the predicted order; accumulating means, comprising a plurality of accumulating circuits connected as a pipeline, for parallel inputting original and reference image data for the motion vector candidates of a plurality of motion vector candidate groups in accordance with the priority orders determined by the priority order determining means, to parallel process accumulation operations for a plurality of motion vectors; accumulation stopping means for separately stopping the accumulation operation for each of the accumulating circuits of the accumulating means; and control means for controlling supply of the original and reference image data for the motion vector candidates for each of the accumulating circuits, to output a separate stop signal for stopping accumulation in one of the accumulating circuits from the accumulation stopping means to stop accumulation in the one of the accumulating circuits, and for causing the accumulation stopping means to output the stop signal in an initial stage of a series of reviewing operations by causing the accumulating means to review the motion vector candidates of the group having the high possibility to complete the reviewing of the motion vector candidate having the high possibility serving as a final motion vector candidate in the initial stage of the series of reviewing operations.

The grouping means may be associated with the priority order determining means to form motion vector candidate group assigning means, the priority order determining means dynamically setting priority orders for each of the motion vector candidate groups, which are grouped by the grouping means, to accumulate the difference between signal strength of pixels of the original and reference images corresponding to motion vector candidates for each of the motion vector candidate groups in accordance with the priority orders.

The priority order determining means may include measuring means, incorporated in an image pick-up system, for measuring an angular speed or an angular acceleration for motion of a moving picture picked up by the image pick-up system, to estimate motion vectors in the moving picture using a reference motion vector derived on the basis of the measured value of the angular speed or angular acceleration supplied from the measuring means.

The priority order determining means may determine the priority orders for the motion vector candidate groups using, as a reference motion vector, a global motion vector of a target object in the moving picture, the global motion vector being obtained by searching the whole frame for a portion of a characteristic point of the target object.

The priority order determining means may determine the priority orders of motion vector candidate groups using, as a reference motion vector, a motion vector in a single macro block or in each of a plurality of macro blocks, which exist in the same frame as a frame including the macro block or macro blocks wherein motion vector estimation is carried out, and in which motion vector estimation has been carried out before the motion vector estimation in the macro block or macro blocks.

The priority order determining means may determine the priority orders of the motion vector candidate groups using, as a reference motion vector, a motion vector in a single macro block or in each of a plurality of macro blocks, in which motion vector estimation has been completed, the single macro block or the plurality of macro blocks being one or some of macro blocks, which are included in a frame at a point of time different from that of a frame including macro blocks wherein motion vectors are estimated, and which exist at coordinates in vicinity of the macro block or the same coordinates as those of the macro block.

The priority order determining means may include weighting means for suitably weighting a reference motion vector after selecting the reference motion vector, and determines priority orders for motion vector candidate groups weighted by the weighting means.

According to another aspect of the present invention, there is provided a motion vector estimation method for setting, as motion vector candidates, vectors in an appropriate range for a macro block, which is an image of a predetermined range in a frame or field in a moving picture, to calculate a difference between signal strength for images corresponding to motion vector candidates of original and reference images, to accumulate the calculated difference between the signal strength for images in the macro block to derive accumulation results to select, as a motion vector, a motion vector candidate having a local maximum or local minimum accumulation result from the set motion vector candidates, the motion vector estimation method comprising the steps of: grouping motion vector candidates in a search range, which is set for the motion vector candidates, into a plurality of motion vector candidate groups; predicting an order from a motion vector candidate group, which has a high possibility of including a true motion vector, to a motion vector candidate group, which has a low possibility of including the true motion vector, to determine priority orders for accumulation to estimate motion vectors in accordance with the predicted order; parallel inputting original and reference image data for the motion vector candidates, to parallel process accumulation operations for a plurality of motion vectors in accordance with the determined priority orders by means of a plurality of pipeline stages; selecting motion vectors, the number of which corresponds to the number of the plurality of pipeline stages; reviewing the motion vector candidates by means of the pipeline stages including the step of accumulation; determining whether all of the motion vector candidates included in the motion vector candidate group of that priority order have been reviewed; determining whether motion vectors for all of the motion vector candidate groups have been reviewed in accordance with the priority orders; and outputting a remaining motion vector as a true motion vector.

The step of grouping the motion vector candidates into the plurality of motion vector candidate groups may be carried out using, as a reference motion vector, a global motion vector of a target object obtained by searching the whole frame for a portion serving as a characteristic point of the target object in the moving picture.

The step of determining the priority orders of the plurality of motion vector candidate groups may include a step of suitably weighting a reference motion vector after selecting the reference motion vector.

With the above construction, according to the present invention, motion vector candidates to be reviewed are divided into groups of predetermined regions, and the order for reviewing motion vectors is suitably changed every group, so that it is possible to prevent macro blocks having lowered finding efficiency in a frame from being sequentially arranged. Specifically, the priority orders of motion vector candidates to be reviewed are assigned on the basis of the following standard. When macro blocks in a certain frame is noticed:

(1) Priority is given to a motion vector candidate group including a motion vector of a macro block arranged in vicinity of a macro block, in which motion vector estimation has been carried out, in the same frame, or a motion vector candidate group arranged in vicinity thereof.

(2) Priority is given to a motion vector candidate group including a motion vector of a macro block or a macro block adjacent thereto, in which motion vector estimation has been completed, in temporally last and next frames, or a motion vector candidate group in vicinity thereof.

(3) When a motion vector estimation circuit is incorporated in a hand camera or the like, there are some cases where a device, such as an optical fiber gyro, which is capable of acquiring an angular speed or angular acceleration information, is mounted therein in order to prevent the movement of the hands. Priority is given to a motion vector candidate group including a motion vector based on the information from such a device, or a motion vector candidate group arranged in vicinity thereof.

(4) Priority is given to a motion vector candidate group including a global motion vector of a target object obtained by searching for a portion serving as a characteristic point of the target object, or a motion vector candidate group arranged in vicinity thereof.

By these techniques, it is possible to statistically improve the order for reviewing a vector to be finally a motion vector. By such improvement, it is possible to enhance the efficiency of the motion vector estimation circuit. Furthermore, the motion vector estimation circuit and the motion vector estimation method according to the present invention includes grouping means and priority order determining means in addition to the accumulating means and accumulation stopping means in the motion vector estimation system and method disclosed in Japanese Patent Application No. 8-341928 (1996).

DESCRIPTION OF THE PREFERRED EMBODIMENTS

Referring now to the accompanying drawings, the preferred embodiments of a motion vector estimation circuit and a motion vector estimation method according to the present invention will be described in detail below.

First, referring to FIG. 1, the first preferred embodiment of a motion vector estimation circuit according to the present invention, which is a motion vector estimation circuit having the most basic construction according to the present invention, will be described. The first preferred embodiment of the motion vector estimation circuit is designed to group motion vector candidates into a plurality of units existing in a specific region so that the searching order for the motion vector candidates can be dynamically set every motion vector candidate group.

Figure 1:
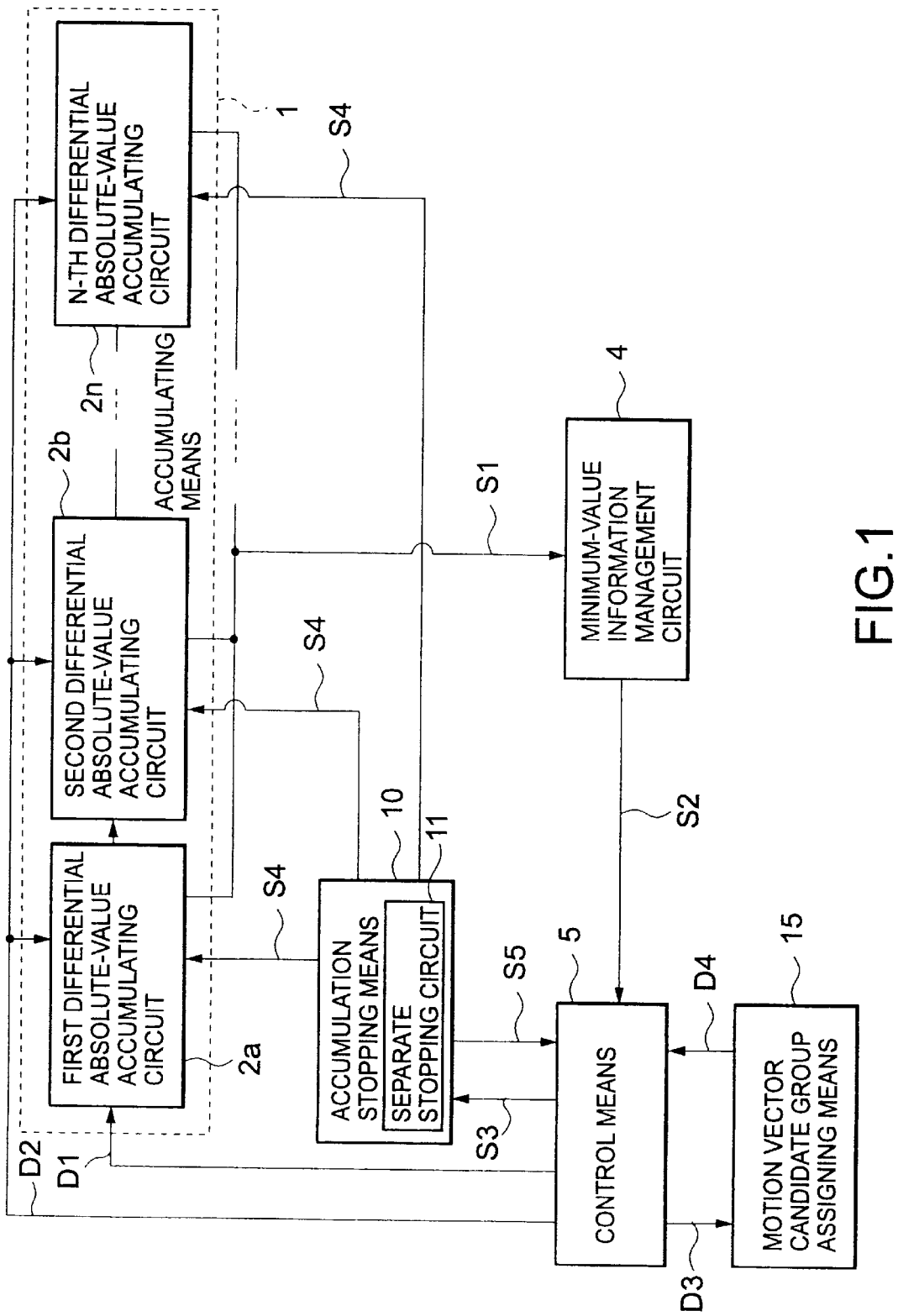
FIG. 1 is a block diagram of the first preferred embodiment of a motion vector estimation circuit according to the present invention.
Figure 15:
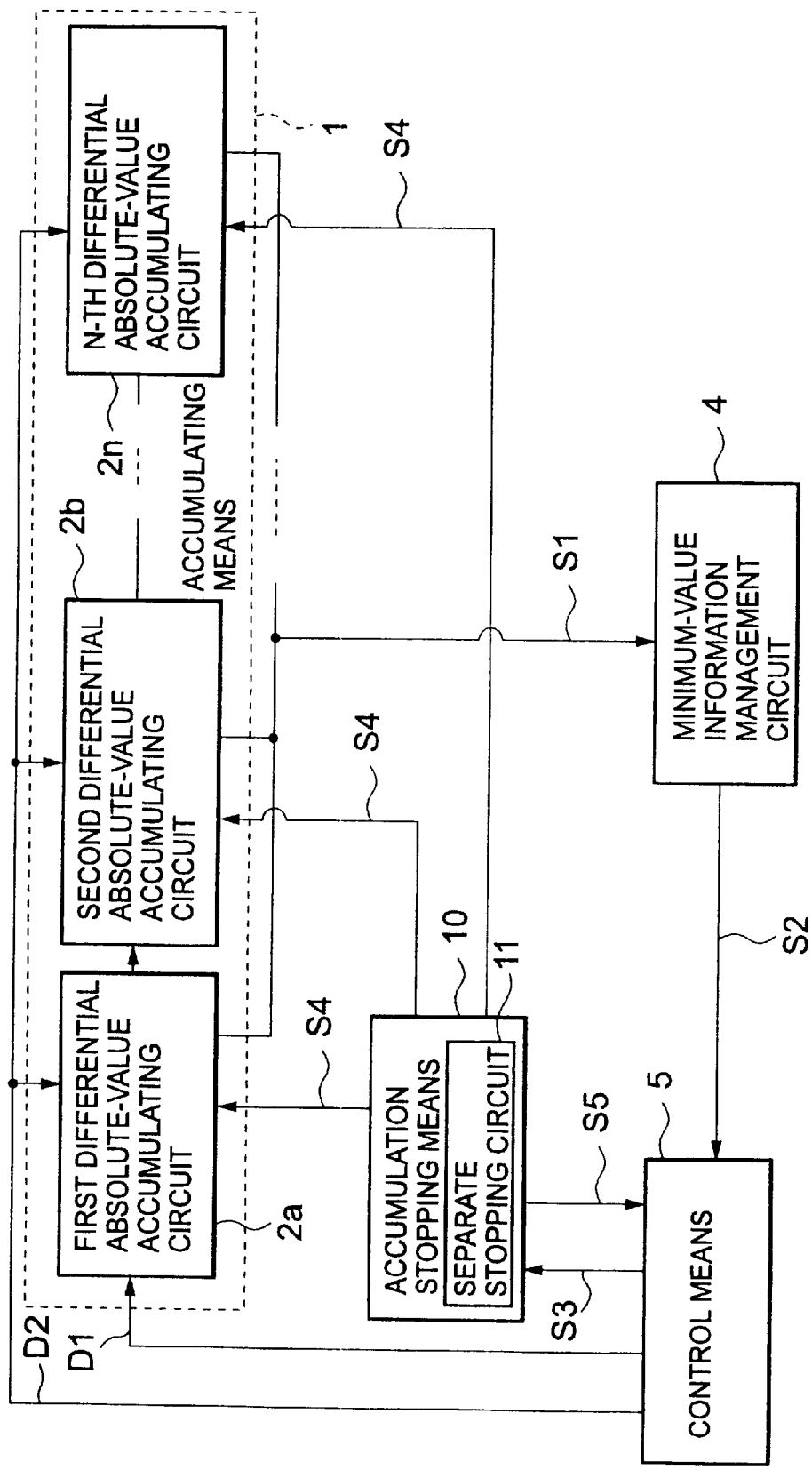
FIG. 15 is a block diagram of a conventional motion vector estimation system.

As shown in FIG. 1, the first preferred embodiment of the motion vector estimation circuit has a motion vector candidate group assigning block 15 in addition to the conventional motion vector estimation system shown in FIG. 15. The motion vector candidate group assigning block 15 includes region dividing means and order determining means. Control means 5 supplies data D3, such as a reference motion vector, to the motion vector candidate assigning block 15, and acquires motion vector candidate group data D4. This motion vector estimation circuit will be described in detail below.

Figures 2A, 2B:
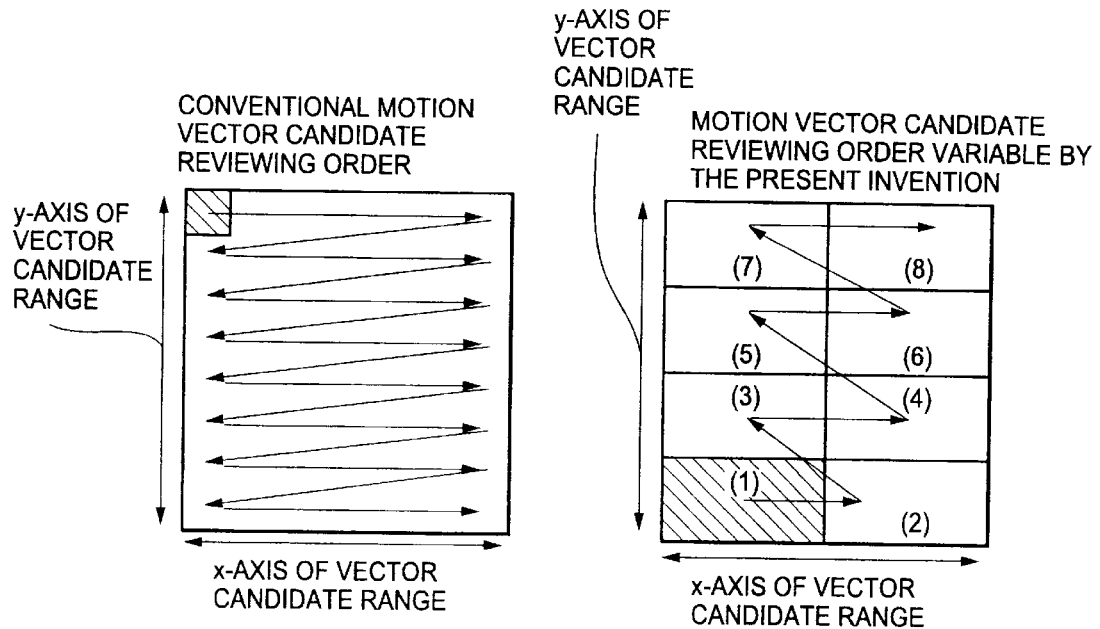
FIG. 2A is a schematic view showing an estimation order in a conventional motion vector estimation system shown in FIG. 15.
FIG. 2B is a schematic view showing an estimation order in the first preferred embodiment of a motion vector estimation circuit according to the present invention, which is shown in FIG. 1.

In a motion vector estimation, accumulating means 1 separately accumulates the difference between the signal value of a pixel of a macro block of an accumulated original image and the signal value of a pixel of a reference image region corresponding to a motion vector candidate, to select a motion vector candidate having the minimum accumulation result as a motion vector. In the conventional motion estimation system shown in FIG. 15, the motion vector candidates are sequentially reviewed in fixed order shown in FIG. 2A. On the other hand, in the first preferred embodiment of a motion vector estimation circuit according to the present invention, motion vector candidates are divided into motion vector candidate groups, which comprise 8 partial regions (2 columns×4 rows), and the motion vector candidates are sequentially reviewed by accumulating the strength difference between the signal values of pixels corresponding to original and reference images in a region of a motion vector candidate group in accordance with the priority order of each of the groups.

The priority orders of the groups are determined on the basis of the motion vector candidate group data D4, which is not a fixed value and which can be suitably changed in the motion vector estimating process. The grouping of motion vector candidates should not be limited to that shown in FIG. 2B, and the number of groups should not be limited to 8, but it may be suitably changed to a suitable value, e.g., 16 or 32. In addition, while the motion vector estimation circuit is operating, the motion vector candidate group assigning means 15 may dynamically change how to group motion vector candidates.

Figures 3A, 3B:
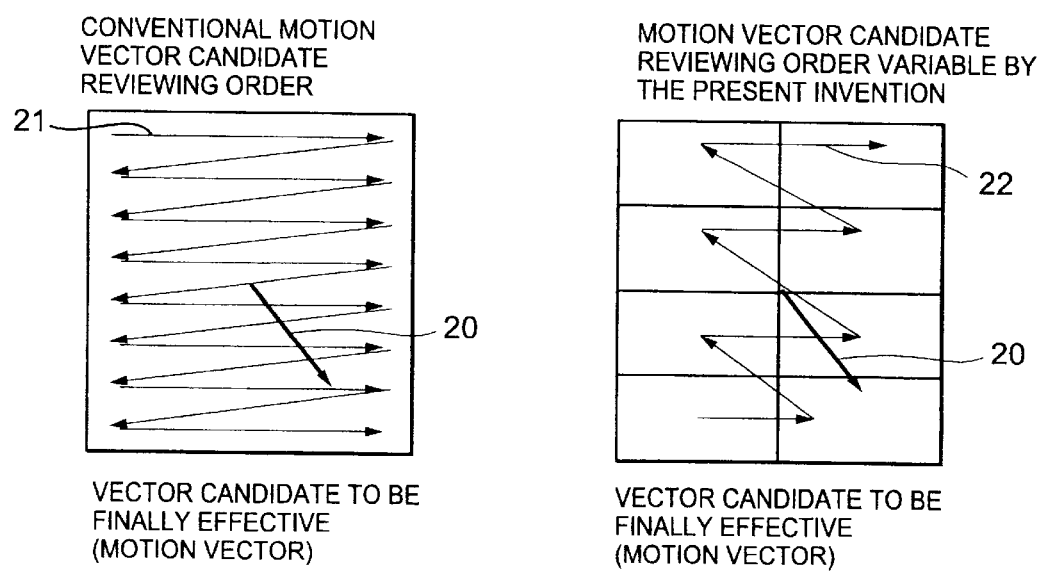
FIG. 3A is a schematic view showing an estimation order in a conventional motion vector estimation system shown in FIG. 15.
FIG. 3B is a schematic view showing an estimation order for motion vector candidate groups in the first preferred embodiment of a motion vector estimation circuit according to the present invention, which is shown in FIG. 1.

Referring to FIGS. 3A and 3B, the operation of the first preferred embodiment of the motion vector estimation circuit with the above construction will be described. An example of a motion vector retrieval for the same motion vector candidate 20, which is shown in FIGS. 3A and 3B, by means of the conventional motion vector estimation system shown in FIG. 15 and the first preferred embodiment of the motion vector estimation circuit shown in FIG. 1 will be described. When motion vectors are estimated in fixed retrieval order 21 as the conventional motion vector estimation system shown in FIG. 3A, the motion vector candidate 20 which will be finally effective, i.e., a true motion vector, shown in FIG. 3A, is estimated in the end half of the estimation process.

On the other hand, if the retrieval order is suitably changed as the first preferred embodiment of the motion vector estimation circuit shown in FIG. 3B, when the retrieval order 22 is appropriate, the motion vector candidate 20 which will be finally effective can be estimated in the front half of the estimation process. In the case of motion vector estimation circuits used for estimating motion vectors in estimation processes of a fixed number of cycles, there is not much difference between both systems. However, in the case of the conventional motion vector estimation system, the number of cycles necessary for estimating motion vectors is variable. Therefore, as the motion vector candidate which will be finally effective is more early estimated, the number of cycles necessary for estimation is decreased, and electric consumption is also reduced.

Therefore, in comparison with the conventional motion vector estimation system shown in FIG. 15, which can change estimation cycle, the first preferred embodiment of the motion vector estimation circuit, which additionally has the motion vector candidate group assigning means capable of dynamically changing the retrieval order of motion vectors, is very significant to quickly accumulate a finally effective motion vector candidate which is a true motion vector.

While the first preferred embodiment of the motion vector estimation circuit is designed to greatly improve the retrieval speed when accumulation is carried out in a variable cycle by causing the order of retrieval processes for motion vector candidates to be variable, the rule of the variable reviewing order for motion vector candidate groups will be described on the basis of the second preferred embodiment of a motion vector estimation circuit according to the present invention. The second preferred embodiment of the motion vector estimation circuit is designed to detect an external angular speed or an external angular acceleration to determine the retrieval order for motion vector candidate groups on the basis of the angular speed or the angular acceleration, or to estimate a global motion vector using a characteristic point existing in a picked-up moving picture to determine the retrieval priority order for motion vector candidate groups on the basis of the global motion vector.

Figure 4:
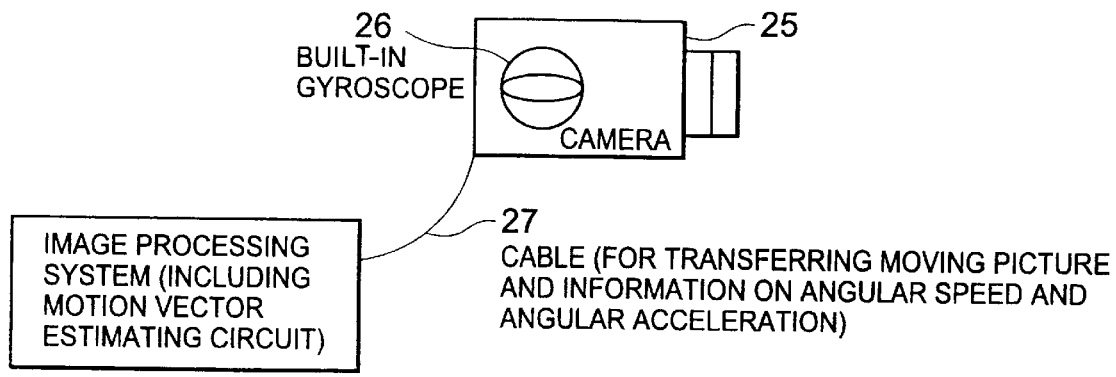
FIG. 4 is a schematic view showing an image pick-up system and an image processing system including the second preferred embodiment of a motion vector estimation circuit according to the present invention.

As shown in FIG. 4, the second preferred embodiment of the motion vector estimation circuit is designed to receive information, which is necessary for estimating a reference motion vector, from an image pick-up system, such as a video camera 25. In FIG. 4, the video camera 25 has a built-in gyroscope 26, and is connected to an image processing system 30 via a cable 27. The image processing system 30 includes a motion vector estimation circuit having the construction shown in FIG. 1. The image processing system 30 is designed to obtain macro block data D1 and reference image data D2 using a moving picture fed from the image pick-up system to control accumulation on the basis of the obtained information and to divide motion vector candidates in a macro block and the reference image into a plurality of groups to determine the retrieval order in view of a group, from which the accumulation operation is started to obtain the optimum operation efficiency, to carry out the accumulation operation for pixels in a specific region serving as an object to derive the difference between signals of both pixels to compare the difference with the minimum value to estimate a motion vector candidate, which is effective as a motion vector, from the motion vector candidates.

Figures 5A, 5B:
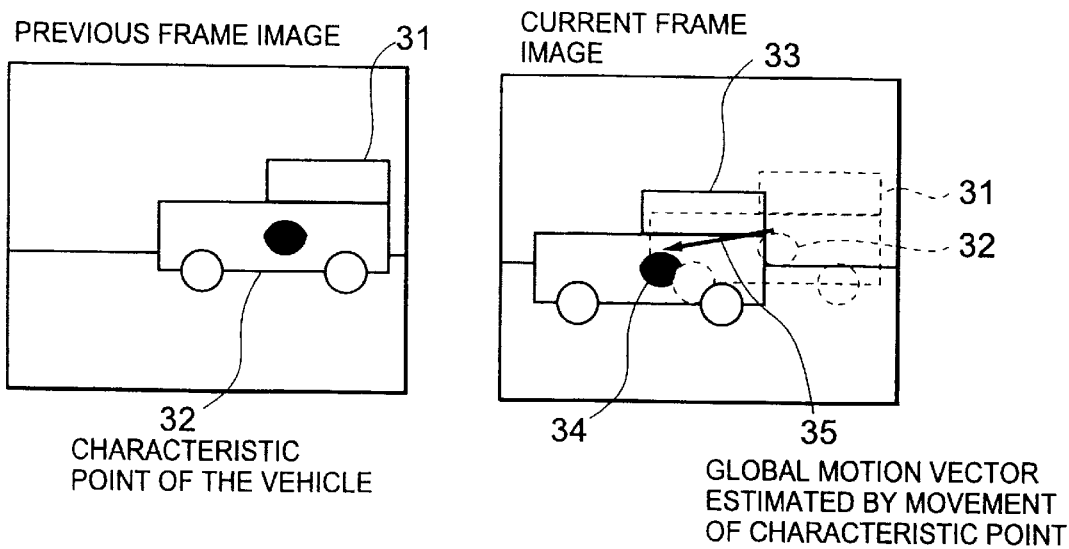
FIGS. 5A and 5B are schematic views each showing a global motion vector estimated by the movement of a characteristic point between the previous frame image shown in FIG. 5A and the current frame image shown in FIG. 5B in the second preferred embodiment.

As shown in FIGS. 5A and 5B, the reference motion vector in the second preferred embodiment of the motion vector estimation circuit is obtained by searching the whole frame for a characteristic image of a specific object in a moving picture to drive the difference between frames. That is, a moving vehicle 31 serving as an object to be estimated in the last frame image of a moving picture shown in FIG. 5A has a characteristic point 32, and the current frame image of a moving picture shown in FIG. 5B shows a vehicle 33 after movement and a characteristic point 34 of the vehicle 33. As shown in FIG. 5B, the locus of movement between the characteristic point 32 of the last frame image and the characteristic point 34 of the current frame image is obtained as a global motion vector 35 estimated by the movement of characteristic point. The reference motion vector is obtained by such a technique shown in FIGS. 4 through 5B. In this example, since the number of reference motion vectors is 1, a method for assigning priority orders is carried out by the procedure shown in FIG. 6.

Figure 6:
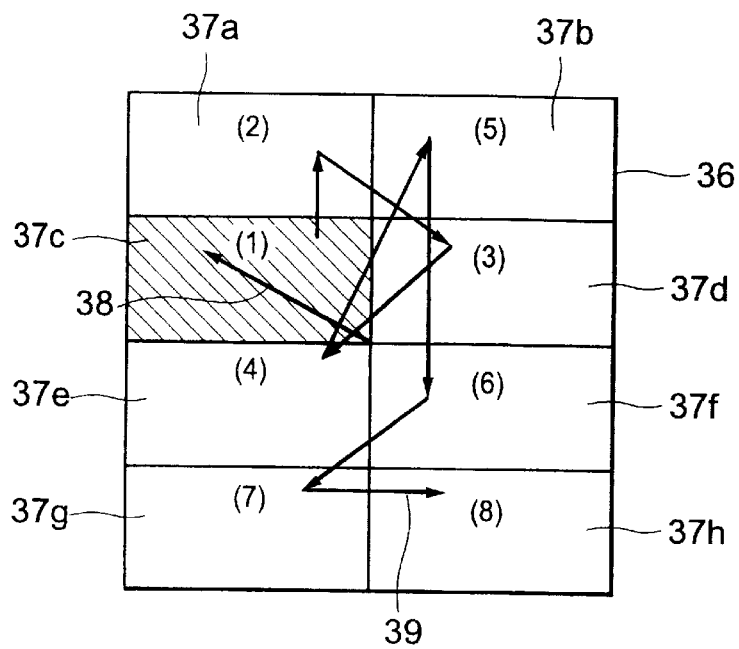
FIG. 6 a schematic view showing an estimation order for motion vector candidate groups in the second preferred embodiment of a motion vector estimation circuit according to the present invention.

In FIG. 6, a motion vector candidate reviewing range 36 is divided into 8 motion vector candidate reviewing groups 37a, 37b, 37c, 37d, 37e, 37f, 37g and 37h of 2 columns×4 rows. The motion vector candidate reviewing group 37c including a reference motion vector 38 has the first priority order for accumulation. The motion vector candidate reviewing group 37a, which is most close to the reference motion vector 38 other than the group 37c, has the second priority order. Thereafter, the reviewing order 39 is assigned to each of the remaining groups in order that the remaining groups are reviewed clockwise about the group 37c of the first priority order from that nearest the group 37c. That is, the reviewing order 39 is assigned so that 37d→37e→37b→37f→37g→37h. However, other methods for assigning the priority orders may be used. For example, the priority orders may be assigned in view of the influence, such as the dividing state of motion vector candidate groups. Alternatively, the accumulating order of motion vector candidate groups may be dynamically changed to be assigned in view of the estimation state of motion vectors in the motion vector estimating process.

Figure 7:
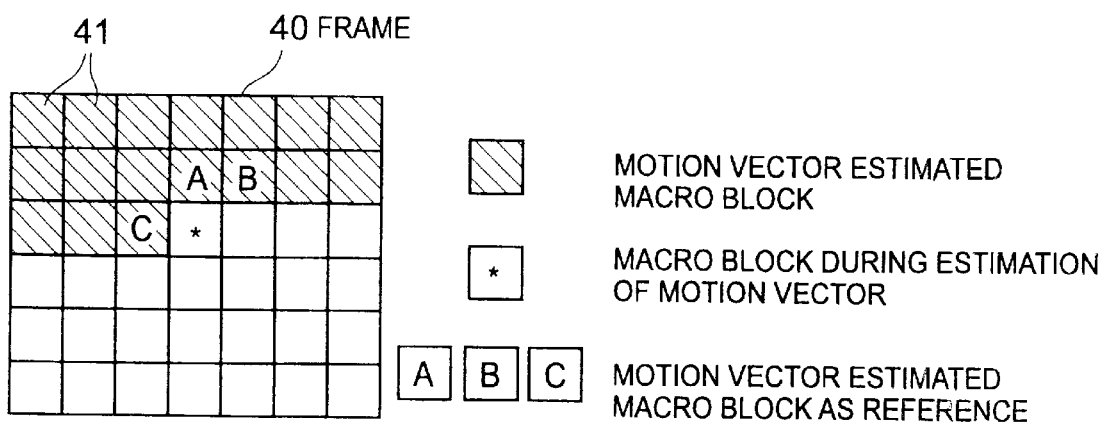
FIG. 7 is a schematic view showing the relationship between a macro block, in which motion vectors have been estimated in a frame, and a macro block during estimation of motion vectors in the same frame, in the third preferred embodiment of a motion vector estimation circuit according to the present invention.
Figure 8:
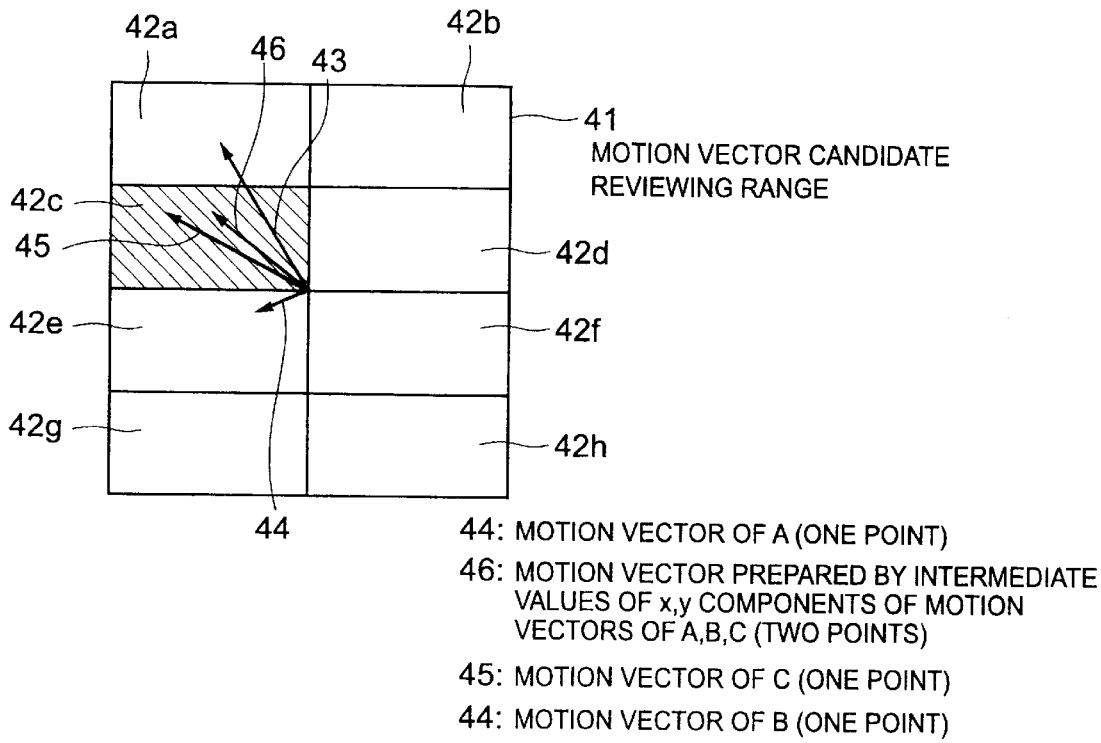
FIG. 8 is a schematic view showing an example of weighting for reference motion vectors and motion vector candidate groups in the third preferred embodiment of a motion vector estimation circuit according to the present invention.
Figure 9:
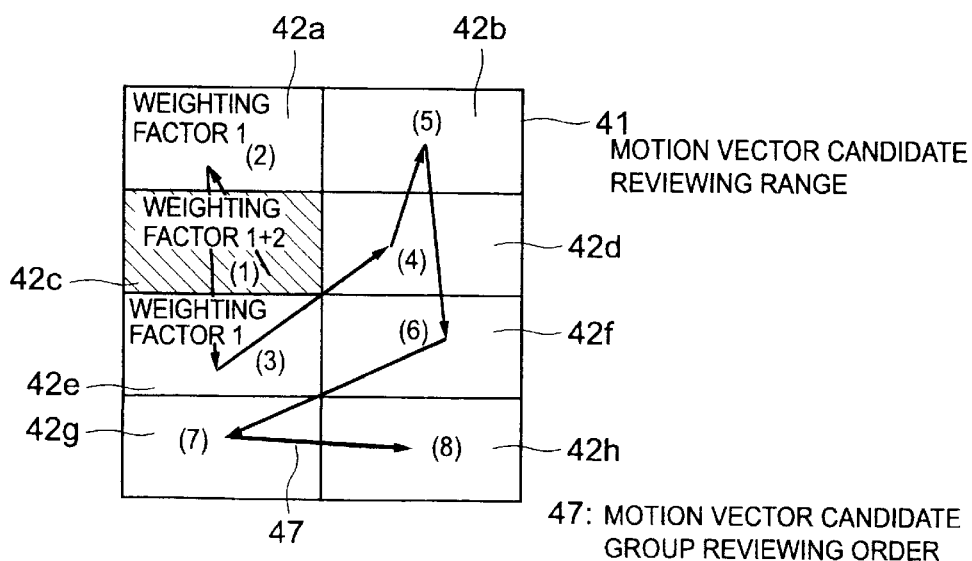
FIG. 9 is a schematic view showing an example of weighting and assignment of priority orders for motion vector candidate groups in the third preferred embodiment of a motion vector estimation circuit according to the present invention.

Referring to FIGS. 7 through 9, the third preferred embodiment of a motion vector estimation circuit according to the present invention will be described below.

The third preferred embodiment of the motion vector estimation circuit is designed to assign the priority orders of motion vector candidate groups on the basis of motion vectors, which have been estimated in the same frame, to accumulate motion vector candidates in accordance with the priority orders. In the third preferred embodiment of the motion vector estimation circuit, the number of reference motion vectors is plural, not 1. Therefore, when the priority orders of motion vector candidate groups are determined, it is required to assign priority orders after suitable weighting. The third preferred embodiment will be described in detail below.

FIG. 7 shows the third preferred embodiment of a motion vector estimation circuit according to the present invention. A frame 40 is divided into a plurality of macro blocks 41. FIG. 7 shows the positional relationship in the same frame 40 between a macro block "*" during estimation of motion vectors and macro blocks A, B and C providing reference motion vectors. With respect to motion vector candidate groups including the reference motion vectors, weighting was carried out as shown in FIG. 8. In FIG. 8, the macro block 41 serving as a motion vector candidate reviewing range is divided into a plurality of specific regions 42a through 42h. Reference number 43 denotes a motion vector of A as a reference, and reference number 44 denotes a motion vector of B. In addition, reference number 45 denotes a motion vector of C, and reference number 46 denotes a motion vector prepared on the basis of the intermediate value of each of x and y components of the motion vectors of A, B and C. A point is added to each of the motion vector candidate groups including the motion vectors 43, 44 and 45 of A, B and C, and two points are added to the motion vector candidate group including the reference vector 46 obtained by the intermediate value of each of x and y components of the motion vectors A, B and C, so that weighting is carried out.

In FIG. 9, motion vectors are retrieved sequentially from a motion vector candidate group having a large weighting factor. With respect to motion vector candidate groups having a weighting factor of 0, the motion vector candidates are reviewed clockwise about the motion vector candidate group having the largest weighting factor from a motion vector candidate group nearest the motion vector candidate group having the largest weighting factor. Specifically, the retrieval is started from the motion vector candidate group 42c having a heaviest weighting factor of 3. Then, the groups having a weighting factor of 1 are retrieved clockwise. That is, the motion vector candidate group 42a having a weighting factor of 1 is retrieved, and then, the motion vector candidate group 42e having a weighting factor of 1 is retrieved. Thereafter, the motion vector candidate groups 42d, 42b, 42f, 42g and 42h having no weighting factor are accumulated in that order. Such a retrieval order is shown by arrow 47 in FIG. 9 as a motion vector candidate group reviewing order.

Furthermore, in the third preferred embodiment of the motion vector estimation circuit, the macro blocks as references shown in FIG. 7 should not be limited to that shown in the drawing, and the number of the macro blocks may be different. In addition, the weighting system shown in FIG. 8 is a simple example, and the weighting system may be more complicated. Moreover, the retrieval order shown in FIG. 9 may be suitably changed, e.g., the retrieval of the coordinate groups may be counterclockwise carried out.

While the accumulating order for motion vector candidates has been variable in the third preferred embodiment of the motion vector estimation circuit, the present invention should not be limited thereto, but the priority orders of the motion vector candidate groups may be determined on the basis of the motion vectors estimated in the temporally last and next frames as the fourth preferred embodiment of a motion vector estimation circuit according to the present invention. The assignment for priority orders of motion vector candidate groups in the fourth preferred embodiment of the motion vector estimation circuit must be carried out after suitable weighting since the number of vectors as references is plural. The fourth preferred embodiment of a motion vector estimation circuit according to the present invention will be described below.

Figure 10:
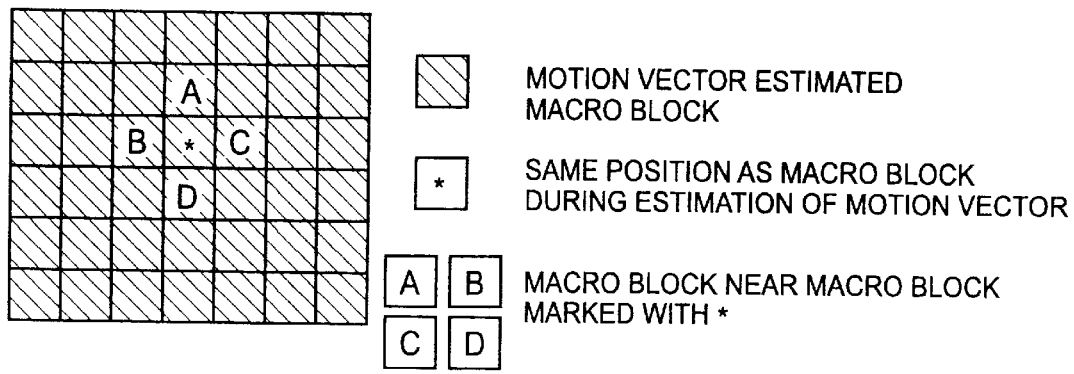
FIG. 10 is a schematic view showing an example of assignment of priority orders for motion vector candidate groups on the basis of the estimated motion vectors in temporally different frames in the fourth preferred embodiment of a motion vector estimation circuit according to the present invention.
Figure 11:
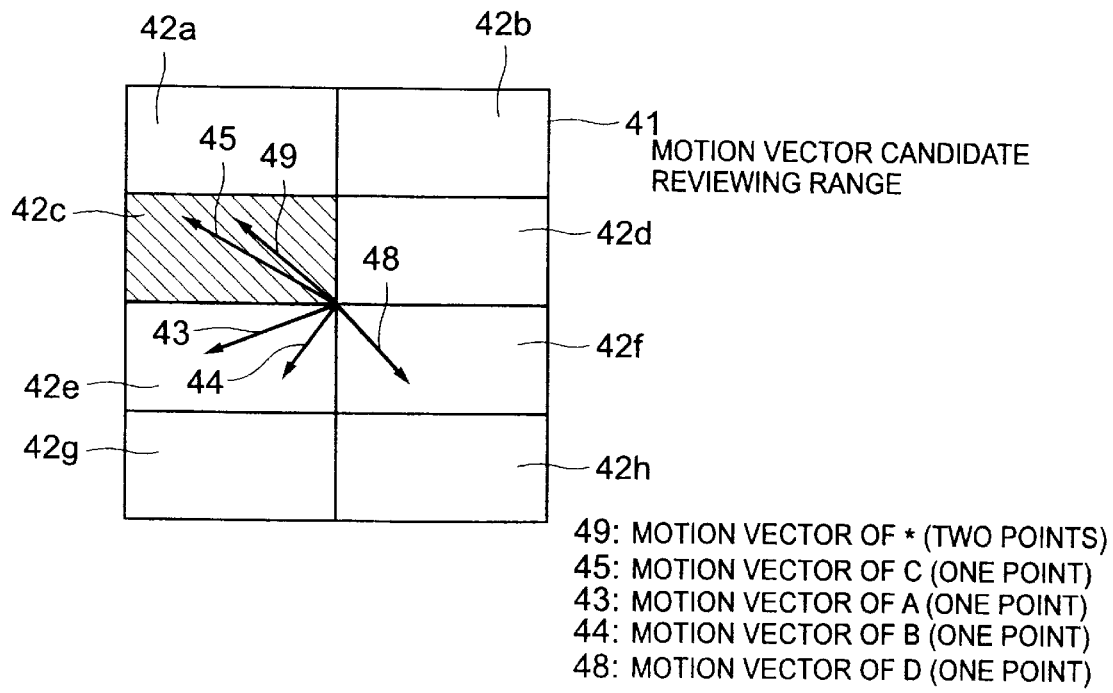
FIG. 11 is a schematic view showing an example of weighting for reference motion vectors and motion vector candidate groups in the fourth preferred embodiment of a motion vector estimation circuit according to the present invention.
Figure 12:
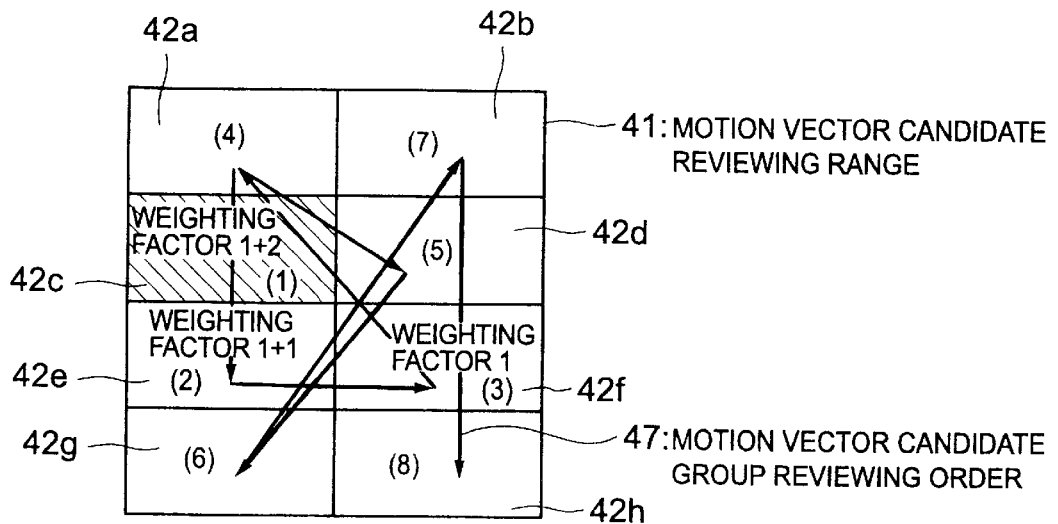
FIG. 12 is a schematic view showing an example of weighting and assignment of priority orders for motion vector candidate groups in the third preferred embodiment of a motion vector estimation circuit according to the present invention.

FIG. 10 shows the positional relationship between macro blocks as references in temporally different frames. A macro block "*" exists at the same coordinates as those of a macro block, in which motion vectors are currently estimated, and macro blocks A, B, C and D exist in the vicinity of the macro block "*". With respect to motion vector candidate groups including motion vectors serving as references, weighting was carried out as shown in FIG. 11. Furthermore, in FIGS. 11 and 12, the same reference numbers as those in FIGS. 8 and 9 are used for convenience. A point was added to each of motion vector candidate groups including a reference motion vector 43 of A, a reference motion vector 44 of B, a reference motion vector 45 of C and a reference motion vector 48 of D, and two points were added to a motion vector candidate group including a reference motion vector 49 of "*". Therefore, with respect to the weighting factors of specific regions 42a through 42h in a motion vector candidate reviewing range 41, the proposed groups 42c, 42e and 42f have weighting factors of 3, 2 and 1, respectively. In FIG. 12, motion vectors are sequentially retrieved from a motion vector candidate group having a large weighting factor. With respect to the motion vector candidate groups 42a, 42b, 42d, 42g and 42h having a weighting factor of 0, motion vector candidates are reviewed clockwise about the motion vector candidate group having the largest weighting factor from that nearest the motion vector candidate group having the largest weighting factor. Specifically, the reviewing order is 42c→42e→42f→42a→42d→42g→42b→42h as shown by (1) through (8) in FIG. 12.

The macro blocks serving as references should not be limited to those shown in FIG. 10, and the number of the macro blocks may be different. In addition, the weighting system shown in FIG. 11 is a simple example, and the weighting system may be more complicated. Moreover, the retrieval order shown in FIG. 12 may be suitably changed.

Figure 13:
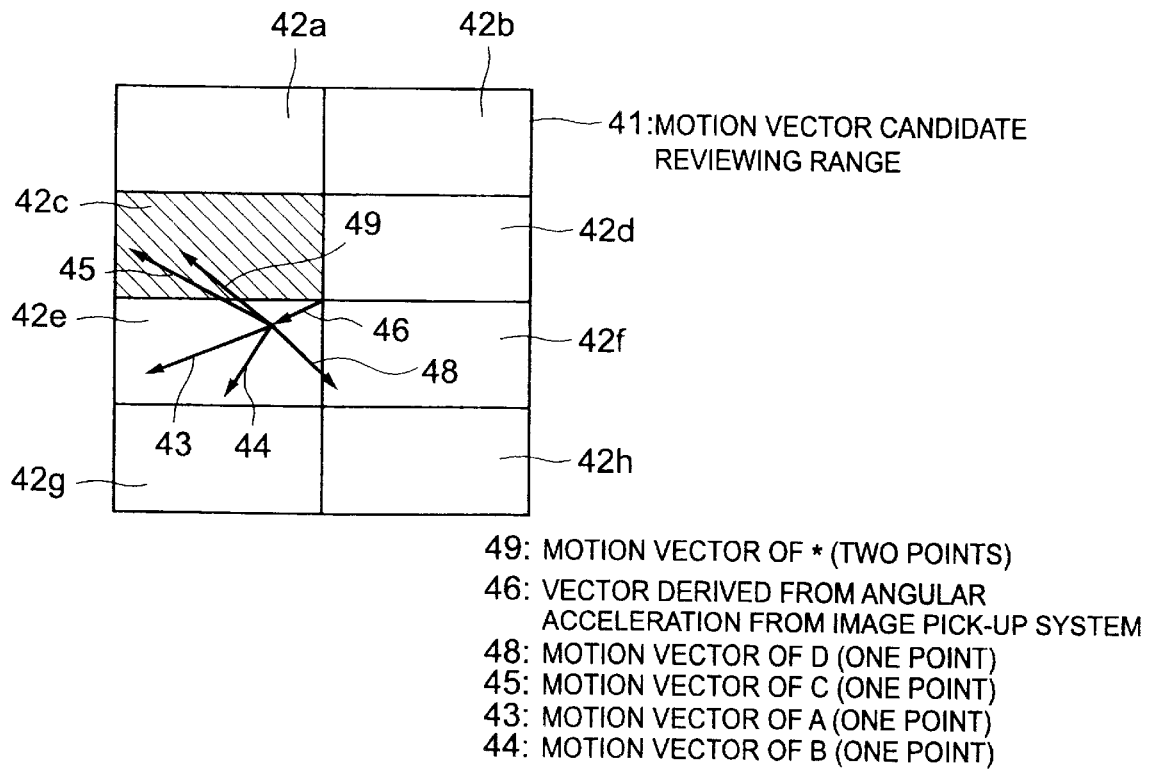
FIG. 13 is a schematic view showing an example of weighting for reference motion vectors and motion vector candidate groups in the fifth preferred embodiment of a motion vector estimation circuit according to the present invention.

Referring to FIG. 13, the firth preferred embodiment of a motion vector estimation circuit according to the present invention will be described. The fifth preferred embodiment of the motion vector estimation circuit is also designed to assign the priority orders of motion vector candidate groups on the basis of motion vectors, which have been estimated in the temporally last and next frames. In addition, the assignment of priority orders of motion vector candidate groups serving as references must be carried out after suitable weighting since the number of vectors serving as references is plural. Referring to FIG. 13, an example of weighting will be described. This example uses both of a vector calculated from an angular acceleration information derived from the image pick-up system in the second preferred embodiment of the motion vector estimation circuit, and a motion vector information of frames at different points in time in the fourth preferred embodiment of the motion vector estimation circuit. In this case, the starting point of a reference motion vector in the fourth preferred embodiment is not the origin, the end point of the motion vector in the second preferred embodiment.

In FIG. 13, the motion vector candidate group 42c has the heaviest weighting factor "1+2=3", and the motion vector candidate group 43e has the second heaviest weighting factor "1+1=2". The motion vector candidate group 42f has a weighting factor of 1, and other groups have no weighting factors. Therefore, the accumulation order for the groups assigned similar to the third and fourth preferred embodiments is groups 42c→42e→42f→42a→42d→42g→42b→42h.

The weighting method shown in FIG. 13 is only an example, and other methods may be used. In addition, the number and kind of motion vectors serving as references should not be limited to this example. Moreover, various weighting methods may be switched during estimation of motion vectors.

Figure 14:
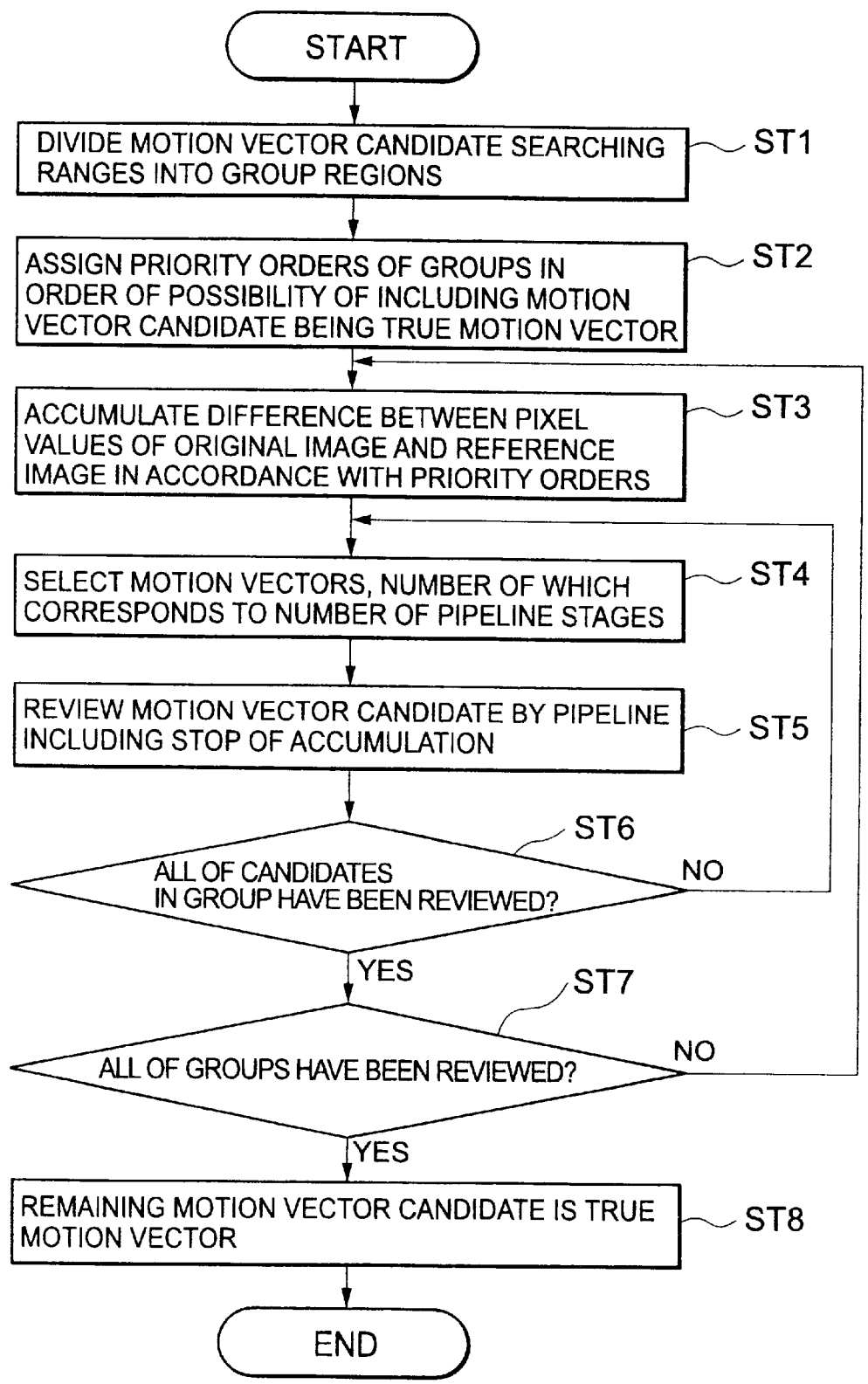
FIG. 14 is a flow chart showing the sixth preferred embodiment of a motion vector estimation method according to the present invention.

Finally, referring to FIG. 14, the sixth preferred embodiment of a motion vector estimation method according to the present invention will be described below. FIG. 14 is a flow chart showing the sixth preferred embodiment of a motion vector estimation method according to the present invention. In the sixth preferred embodiment of the motion vector estimation method, an image of a predetermined range in a frame or field in a moving picture data is set as a macro block, and a motion vector candidate existing in the macro block is selected to calculate the difference between signal strength of pixels corresponding to motion vector candidates of the original and reference images, to accumulate the difference of signal strength calculated for the pixels in the macro block to derive the accumulation results, to select, as a motion vector, a motion vector candidate providing the maximum or minimum accumulation result from motion vector candidates in a specific range in the macro block.

The sixth preferred embodiment of the motion vector estimation method is applied to a motion vector estimation method which comprises the steps of: setting, as a motion vector candidate, a vector of a suitable range for a macro block, which is an image of a predetermined range in a frame or field in a moving picture; calculating the difference between the signal strength of pixels corresponding to the motion vector candidates of the original and reference images; accumulating the difference between the signal strength calculated for the pixels in the macro block to derive the accumulation results; and selecting, as a motion vector, a motion vector candidate providing the maximum or minimum accumulation result from the set motion vector candidates.

In FIG. 14, the motion vector estimation method comprises: a step ST1 of grouping motion vector candidates in a search range, which is set for the motion vector candidates, into a plurality of motion vector candidate groups; a step ST2 of predicting an order from a motion vector candidate group, which has a high possibility of including a true motion vector, to a motion vector candidate group, which has a low possibility of including the true motion vector, to determine priority orders for accumulation to estimate motion vectors in accordance with the predicted order; a step ST3 of parallel inputting original and reference image data for the motion vector candidates to parallel process accumulation operations for a plurality of motion vectors in accordance with the determined priority orders for accumulation by means of a plurality of pipeline stages; a step ST4 of selecting motion vectors, the number of which corresponds to the number of pipeline stages; a step ST5 of reviewing motion vector candidates by means of the pipelines including the stop of accumulation; a step ST6 of determining whether all of the motion vector candidates included in the motion vector candidate group of that priority order have been reviewed; a step ST7 of determining whether the motion vectors for all of the motion vector candidate groups have been reviewed in accordance with the priority orders; and a step ST8 of outputting the remaining motion vector as the true motion vector.

When it is determined at the step ST6 that the reviewing of all of the motion vector candidates in the group has not been completed at the step ST6, the routine returns to the step ST4, so that the processing routine at the steps ST4, ST5 and ST6 is repeated. When it is determined at the step ST6 that all of the motion vector candidates in the group have been reviewed, it is determined at the step ST7 whether the reviewing of all of the groups has been completed. If any groups have not been reviewed, the routine returns to the step ST3, so that the processing operation at the steps ST3 through ST6 is repeated. When it is determined at the step ST7 that the estimation of motion vectors for all of the groups has been completed, it is set at the step ST8 that the remaining motion vector candidate is a true motion vector, and the motion vector estimation ends.

In the motion vector estimation method shown in FIG. 14, the third step ST3 of determining the priority orders of the plurality of divided specific regions may include a step of determining the priority orders for the motion vector candidate groups using, as a reference motion vector, a global motion vector of a target object obtained by searching the whole frame for a portion serving as a characteristic point of the target object in a moving picture.

In the motion vector estimation method shown in FIG. 14, the third step ST3 of determining the priority orders for the plurality of divided specific regions may also include a step of suitably weighting the reference motion vector after selecting the reference motion vector.

As described in detail above, according to the motion vector estimation circuit of the present invention, the accumulation operation cycle is variable. When the differential absolute values for the plurality of motion vector candidates are accumulated, the accumulation is carried out sequentially from a region having a higher possibility of including a true motion vector. When the motion vector is decided, the accumulation for other regions is stopped. Therefore, the time required to estimate motion vectors can be decreased, and the motion vector estimating efficiency can be greatly improved, so that electric power consumption necessary for estimation can be decreased.

In addition, it is possible to obtain high quality reference motion vectors approximated to motion vectors for all of macro blocks, and it is also possible to obtain high quality reference motion vectors approximated to motion vectors for a macro block for a noticeable object in a frame. Moreover, it is possible to obtain high quality reference motion vectors in a moving picture having a spatially close correlation, and it is also possible to obtain high quality reference motion vectors in a moving picture having a temporally close correlation. In addition, the above advantages can be combined to more accurately assign priority orders for motion vector candidate groups.

What is claimed is:

1. A motion vector estimation circuit for setting, as motion vector candidates, vectors in an appropriate range for a macro block, which is an image of a predetermined range in a frame or field in a moving picture, to calculate a difference between signal strength for images corresponding to motion vector candidates of original and reference images, to accumulate the calculated difference between the signal strength for images in the macro block to derive accumulation results to select, as a motion vector, a motion vector candidate having a local maximum or local minimum accumulation result from the motion vector candidates, said motion vector estimation circuit comprising:

grouping means for dividing motion vector candidates in a search range, which is set for said motion vector candidates, into a plurality of motion vector candidate groups;

priority order determining means for predicting an order from a motion vector candidate group, which has a high possibility of including a true motion vector, to a motion vector candidate group, which has a low possibility of including the true motion vector, to determine priority orders for accumulation to estimate motion vectors for each of motion vector candidate groups in accordance with the predicted order;

accumulating means, comprising a plurality of accumulating circuits connected as a pipeline, for parallel inputting original and reference image data for said motion vector candidates of a plurality of motion vector candidate groups in accordance with the priority orders determined by said priority order determining means, to parallel process accumulation operations for a plurality of motion vectors;

accumulation stopping means for separately stopping the accumulation operation for each of said accumulating circuits of said accumulating means; and control means for controlling supply of said original and reference image data for said motion vector candidates for each of said accumulating circuits, to output a separate stop signal for stopping accumulation in one of said accumulating circuits from said accumulation stopping means to stop accumulation in the one of said accumulating circuits, and for causing said accumulation stopping means to output said stop signal in an initial stage of a series of reviewing operations by causing said accumulating means to review said motion vector candidates of said group having the high possibility to complete the reviewing of said motion vector candidate having the high possibility serving as a final motion vector candidate in said initial stage of said series of reviewing operations.

2. A motion vector estimation circuit as set forth in claim 1, wherein said grouping means is associated with said priority order determining means to form motion vector candidate group assigning means, said priority order determining means dynamically setting priority orders for each of said motion vector candidate groups, which are grouped by said grouping means, to accumulate the difference between signal strength of pixels of the original and reference images corresponding to motion vector candidates for each of said motion vector candidate groups in accordance with the priority orders.

3. A motion vector estimation circuit as set forth in claim 1, wherein said priority order determining means includes measuring means, incorporated in an image pick-up system, for measuring an angular speed or an angular acceleration for motion of a moving picture picked up by said image pick-up system, to estimate motion vectors in said moving picture using a reference motion vector derived on the basis of the measured value of the angular speed or angular acceleration supplied from said measuring means.

4. A motion vector estimation circuit as set forth in claim 1, wherein said priority order determining means determines said priority orders for said motion vector candidate groups using, as a reference motion vector, a global motion vector of a target object in said moving picture, said global motion vector being obtained by searching the whole frame for a portion of a characteristic point of the target object.

5. A motion vector estimation circuit as set forth in claim 1, wherein said priority order determining means determines said priority orders of motion vector candidate groups using, as a reference motion vector, a motion vector in a single macro block or in each of a plurality of macro blocks, which exist in the same frame as a frame including the macro block or macro blocks wherein motion vector estimation is carried out, and in which motion vector estimation has been carried out before the motion vector estimation in said macro block or macro blocks.

6. A motion vector estimation circuit as set forth in claim 1, wherein said priority order determining means determines said priority orders of said motion vector candidate groups using, as a reference motion vector, a motion vector in a single macro block or in each of a plurality of macro blocks, in which motion vector estimation has been completed, said single macro block or said plurality of macro blocks being one or some of macro blocks, which are included in a frame at a point of time different from that of a frame including macro blocks wherein motion vectors are estimated, and which exist at coordinates in vicinity of said macro block or the same coordinates as those of said macro block.

7. A motion vector estimation circuit as set forth in claim 1, wherein said priority order determining means includes weighting means for suitably weighting a reference motion vector after selecting said reference motion vector, and determines priority orders for motion vector candidate groups weighted by said weighting means.

8. A motion vector estimation circuit as set forth in claim 1, wherein said accumulation stopping means separately stops an accumulation in each of said plurality of accumulating circuits when an accumulated value becomes greater than said local minimum value of the accumulating result during the accumulation.

9. A motion vector estimation method for setting, as motion vector candidates, vectors in an appropriate range for a macro block, which is an image of a predetermined range in a frame or field in a moving picture, to calculate a difference between signal strength for images corresponding to motion vector candidates of original and reference images, to accumulate the calculated difference between the signal strength for images in the macro block to derive accumulation results to select, as a motion vector, a motion vector candidate having a local maximum or local minimum accumulation result from the set motion vector candidates, said motion vector estimation method comprising the steps of:

grouping motion vector candidates in a search range, which is set for said motion vector candidates, into a plurality of motion vector candidate groups;

predicting an order from a motion vector candidate group, which has a high possibility of including a true motion vector, to a motion vector candidate group, which has a low possibility of including the true motion vector, to determine priority orders for accumulation to estimate motion vectors in accordance with the predicted order;

parallel inputting original and reference image data for said motion vector candidates, to parallel process accumulation operations for a plurality of motion vectors in accordance with the determined priority orders by means of a plurality of pipeline stages;

selecting motion vectors, the number of which corresponds to the number of said plurality of pipeline stages;

reviewing said motion vector candidates by means of said pipeline stages including the step of accumulation;

determining whether all of said motion vector candidates included in said motion vector candidate group of that priority order have been reviewed;

determining whether motion vectors for all of said motion vector candidate groups have been reviewed in accordance with said priority orders; and outputting a remaining motion vector as a true motion vector.

10. A motion vector estimation method as set forth in claim 9, wherein said step of grouping the motion vector candidates into the plurality of motion vector candidate groups is carried out using, as a reference motion vector, a global motion vector of a target object obtained by searching the whole frame for a portion serving as a characteristic point of the target object in the moving picture.

11. A motion vector estimation method as set forth in claim 9, wherein said step of determining the priority orders of the plurality of motion vector candidate groups includes a step of suitably weighting a reference motion vector after selecting the reference motion vector.

12. A motion vector estimation circuit comprising:

a plurality of accumulating circuits connected in parallel with respect to each of motion vector candidates and accumulating each of signal different values between each of pixels within a macro-block region in an original image and each of pixels, corresponding to said each of said pixels within said macro-block region, within a reference image corresponding to said motion vector candidates, and for performing an accumulation of said signal differential values in parallel and starting from a motion vector candidate having a high possibility to be a true motion vector in order;

a selection circuit for selecting as a motion vector a certain motion vector candidate of which an accumulation result becomes a minimum value; and a separate accumulation stopping circuit for separately stopping an accumulation in each of said plurality of accumulating circuits when an accumulated value becomes greater than the minimum value of a latest accumulation result during the accumulation.

* * * * *